United States Patent [19]

Pfannschmidt

[11] Patent Number: 5,509,492
[45] Date of Patent: Apr. 23, 1996

[54] DRIVE INCLUDING AN EXTERNAL ROTOR MOTOR FOR A VEHICLE WHEEL

[75] Inventor: Bernd Pfannschmidt, Rosstal, Germany

[73] Assignee: Siemens Aktiengesellschaft, München, Germany

[21] Appl. No.: 137,311

[22] Filed: Oct. 14, 1993

[30] Foreign Application Priority Data

Oct. 15, 1992 [DE] Germany .......................... 42 34 831.5

[51] Int. Cl.⁶ .................................................. B60K 7/00
[52] U.S. Cl. ........................ 180/65.5; 104/288; 310/67 R
[58] Field of Search .......................... 180/65.5; 104/288; 188/18 A; 310/67 R; 301/6.1

[56] References Cited

U.S. PATENT DOCUMENTS

| | | | |
|---|---|---|---|
| 2,581,551 | 1/1952 | Myrmirides | 180/65.5 |
| 4,406,340 | 9/1983 | Gennaux | 180/65.5 |

FOREIGN PATENT DOCUMENTS

| | | |
|---|---|---|
| 0052344 | 5/1982 | European Pat. Off. . |
| 0249808 | 12/1987 | European Pat. Off. . |
| 0413337 | 2/1991 | European Pat. Off. . |
| 2535418 | 3/1976 | France . |
| 3538513 | 9/1989 | France . |
| 4111627 | 10/1992 | France . |
| 295722 | 12/1987 | Japan ................................. 180/65.5 |
| 342333 | 2/1991 | Japan ................................. 180/65.5 |

*Primary Examiner*—Karin Tyson
*Attorney, Agent, or Firm*—Kenyon & Kenyon

[57] ABSTRACT

A compact, low maintenance, simple-design drive motor (1) for a vehicle wheel (2), rotatably mounted on a running gear (8), is obtained by virtue of the fact that an external rotor motor (1) is provided as the drive motor. The external rotor (3) of the external rotor motor (1) is designed as a wheel support and is rotatably mounted on the running gear (8) and on the stator laminations (4). Stator laminations (4) of the external rotor motor (1) are mounted in the external rotor (3) and nonrotatably mounted on the running gear (8).

14 Claims, 1 Drawing Sheet

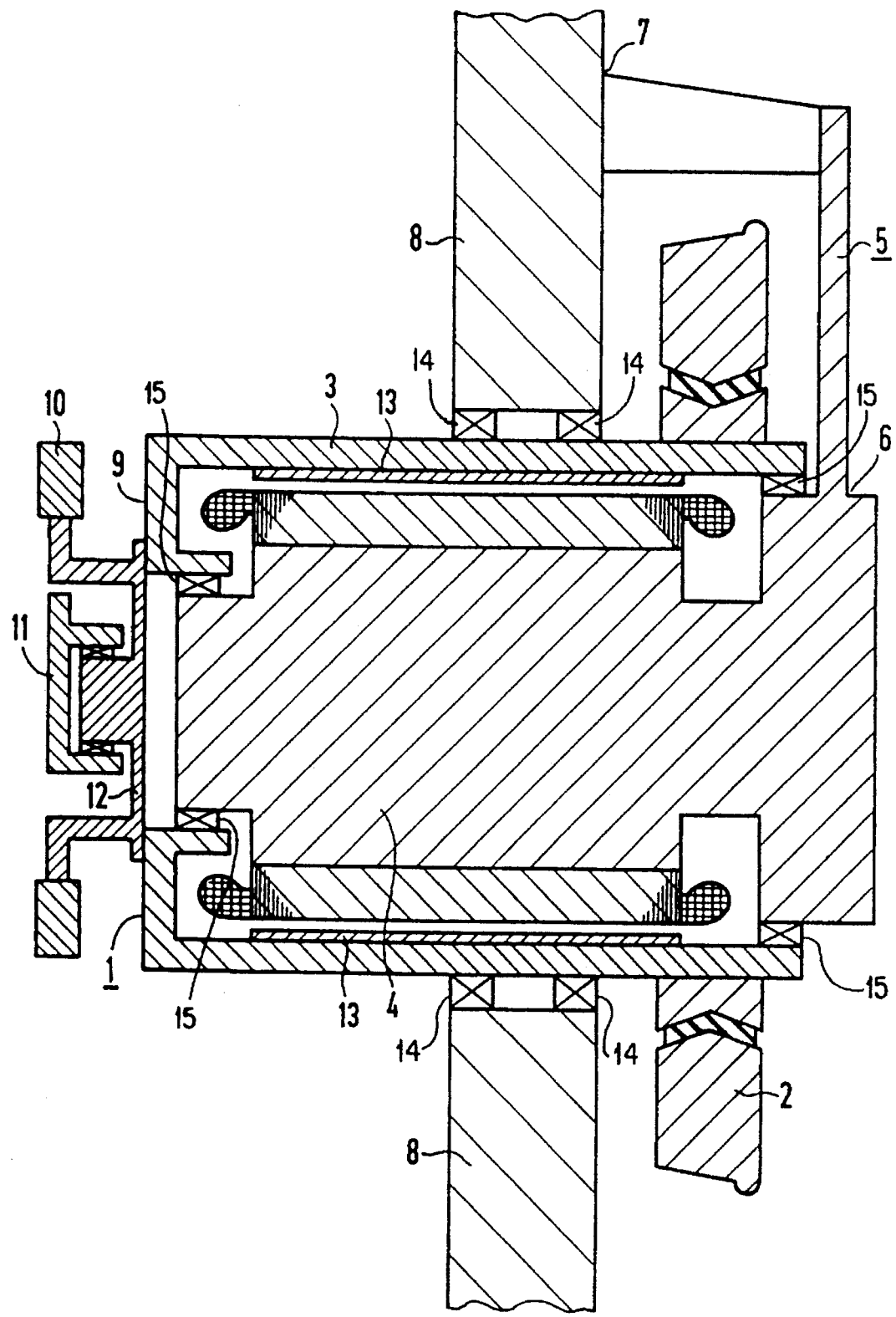

DRIVE INCLUDING AN EXTERNAL ROTOR MOTOR FOR A VEHICLE WHEEL

BACKGROUND OF THE INVENTION

The present invention relates to a drive with an external rotor motor for a vehicle wheel. More particularly, the present invention relates to a drive with an external rotor motor for a vehicle wheel which includes an external rotor designed as a wheel support rotatably mounted on a running gear link (or truck link) and stator laminations nonrotatably mounted on the running gear link.

A drive for a vehicle wheel is described in European Patent Document No. EP 0 052 344 A2. In this drive, the wheel rim of a motor vehicle, already available, is designed as an external rotor. The rotor lamination is mounted nonrotatably on the running gear.

An external rotor motor for an electric vehicle is described in German Patent Document No. DE 41 11 627 A1. The external rotor is incorporated in the rim of the vehicle wheel and thus cannot serve as a wheel support. The axial mounting space of the external rotor is limited by the rim flanges which are mounted by bearings directly on the body of the rim. The rim flanges serve as wheel supports and form the motor shielding. The stator laminations of the external rotor motor are mounted by bearings in the external rotor.

European Patent Document No. EP 0 413 337 A1 discloses an electric-motor direct drive for rail vehicles, in which an electronically commutated housing-less electric motor is mounted axially next to a vehicle wheel to be driven. The electric motor is mounted by its external rotor without interposition of a drive, to the axle shaft of the vehicle wheel to be driven. The direct drive is relatively wide axially, so that the vehicle wheels to be driven require a correspondingly wide wheel housing. As a result, especially in low-floor rail vehicles, the passenger compartment is narrowed in the area of these wheel housings.

German Patent Document No. DE 35 38 513 C2 discloses a hub drive with an electric motor for rail vehicles, in which the wheel support mounted in a wheel guide link is formed by the stator housing part of the electric motor. The rotor shaft of the electric motor is rotatably mounted coaxially with respect to the single wheel and meshes externally axially via a planetary transmission with the single wheel. Because of its compactness, the known wheel hub drive requires only small wheel housings, so that in low-floor rail vehicles a continuous low car floor is possible. However, the wheel hub drive according to German Patent Document No. DE 35 38 513 C2 requires sealing means as well as regular oil changes because of its transmission.

In addition, European Patent Document No. EP 0 249 808 A1 discloses an electric drive for motor vehicles in which the external rotor is mounted on the stator. The external rotor is connected through a transmission with the vehicle wheel to be driven.

Another drive for vehicles is disclosed in German Patent Document No. DE 25 35 418 A1. This drive is an external rotor motor mounted in a common tubular supporting axle of a wheel pair. The stator rests on a rod that runs inside the tubular supporting axle. The external rotor is mounted on the stator. According to a preferred embodiment, the drive motor can be connected by a transmission with the supporting axle.

SUMMARY OF THE INVENTION

The present invention provides a compact and easily maintained drive motor for a vehicle wheel which is simpler in design but of the same size as that previously used.

These features of the present invention are provided by a drive with an external drive rotor motor for a vehicle wheel including an external rotor designed as a wheel support rotatably mounted on a running gear link (or truck link) and stator laminations nonrotatably mounted on the running gear link.

The drive according to the present invention is designed as a wheel hub direct drive. The drive motor is therefore connected through its rotor, without interposition of a transmission, with the vehicle wheel to be driven, rotatably mounted in the running gear. The drive motor may be an external rotor motor whose stator laminations are mounted nonrotatably on the running gear and whose external rotor forms the wheel support for the vehicle wheel to be driven. The external rotor is rotatably mounted on the running gear. The stator laminations are in turn mounted nonrotatably in the external rotor.

The term "running gear" as used in the present application includes not only the running gear side members and running gear links, but also the supporting points in the vehicle body, e.g. in the car body or in the wheel housing.

A wheel hub drive with the drive motor according to the present invention is much simpler in design and is also much easier to maintain, since no transmission is required. Despite the lack of a transmission, more space is not required for the wheel hub drive according to the present invention.

An embodiment according to the present invention may be implemented in which the vehicle wheel is mounted axially inward relative to a bearing of the external drive rotor motor on the running gear link or in a running gear side member. This embodiment makes it possible, even in rail vehicles with relatively narrow gauges, e.g. 1 m, to produce a low-floor vehicle with a relatively wide aisle width in the vicinity of the wheel housings.

BRIEF DESCRIPTION OF THE DRAWING

Further advantages and details of the present invention will become apparent from the following description of an embodiment thereof with reference to and in conjunction with the drawing.

The drawing illustrates a drive motor for a vehicle wheel according to an embodiment of the present invention.

DETAILED DESCRIPTION

In the drawing, reference numeral 1 refers to a drive motor for a vehicle wheel 2. Drive motor 1 is designed as an external rotor motor, whose external rotor 3 serves as a wheel support for a wheel 2 of a driven wheel vehicle.

External rotor motor 1 also incorporates a stator lamination 4, nonrotatably mounted in external rotor 3. For nonrotational mounting of stator laminations 4, a torque support 5, which can be constituted by a push-pull rod, is fastened at one end 6 to stator laminations 4 and at the other end 7 to a truck link (or running gear link) 8. The bearings 15 for external rotor 3 is also located in truck link 8.

Truck link 8 in the present embodiment illustrated in the drawing is designed so that vehicle wheel 2 is located axially inward, due to the mounting of drive motor 1 in truck link 8. Axially external truck link 8, even in rail vehicles with a relatively narrow gauge, can provide a relatively wide aisle in the vicinity of the wheel housings.

In the illustrated embodiment, external rotor 3 is mounted radially externally in truck link 8. The bearings 121, of outer rotor 3 is then simultaneously the bearing for vehicle wheel 2 to be driven.

A brake disk 10 and a ground contact 11 are provided on the axially outward side 9 of outer rotor motor 1. In addition, a bearing cover 12 is mounted on the axially external side 9 of external rotor motor 1. Bearing cover 12 protects the stator laminations 4 and the bearing against contamination.

Brake disk 10 advantageously always runs at the wheel rotational speed, since drive motor 1 of the embodiment of the present invention illustrated in the drawing has no transmission. In contrast to a brake disk which, because of the transmission ratio, runs at a rotational speed that is higher than the wheel rotational speed, much smaller imbalances occur.

The embodiment of the present invention shown in the drawing permits especially simple maintenance, since after the car body is raised, stator laminations 4 can be removed inward from outer rotor 3. Removal of vehicle wheel 2 is also very simple since after raising the car body it is merely necessary to remove torque support 5.

In the external rotor motor 1 shown in the drawing, external rotor 3 includes permanent magnets 13. Drive motor 1 is therefore designed as a permanent-magnet-excited synchronous motor. However, an external rotor motor 1 may be used which is an asynchronous motor. In this case, external rotor 3 would have a rotor lamination.

It is evident in this connection that the present invention is not limited to rail vehicles. Rather, the drive motor according to the present invention may also be used in road vehicles, for example.

What is claimed is:

1. A drive with an external drive rotor motor for a wheel of a vehicle, comprising:

an external rotor designed as a wheel support rotatably mounted radially outward on a running gear link of the vehicle, the running gear link surrounding the external rotor; and stator laminations nonrotatably mounted on the running gear link, the stator laminations mounted in the external rotor and connected by a torque support with the running gear link.

2. A drive according to claim 1, wherein the vehicle wheel is mounted axially inward relative to a bearing of the external drive rotor motor and is mounted on the running gear link closer to a vehicle longitudinal axis.

3. A drive according to claim 1, further comprising a brake disk on a face of the external rotor motor facing away from a vehicle longitudinal axis.

4. A drive according to claim 1, further comprising a ground contact disposed on an axially external side of the external drive rotor motor facing away from a vehicle longitudinal axis.

5. A drive according to claim 2, further comprising a ground contact disposed on an axially external side of the external drive rotor facing away from a vehicle longitudinal axis.

6. A drive according to claim 3, further comprising a ground contact disposed on an axially external side of the external drive rotor motor facing away from a vehicle longitudinal axis.

7. A drive according to claim 2, further comprising a torque support comprising a push-pull rod.

8. A drive according to claim 1, wherein the running gear link is designed as a truck link or a running gear link.

9. A drive according to claim 2, wherein the running gear link is designed as a truck link or a running gear link.

10. A drive according to claim 1, further comprising a bearing cover mounted axially externally on the external rotor said bearing cover at least partially covering the stator laminations on an axially outer face that faces away from a vehicle longitudinal axis.

11. A drive according to claim 2, further comprising a bearing cover mounted axially externally on the external, said bearing cover at least partially covering the stator laminations on an axially outer face that faces away from the vehicle longitudinal axis.

12. A drive according to claim 1, wherein said running gear link comprises a supporting point in a body of the vehicle.

13. A drive according to claim 1, wherein said vehicle is a rail vehicle.

14. A drive according to claim 1, wherein said vehicle is a road vehicle.

* * * * *